United States Patent [19]

Yamada

[11] Patent Number: 5,653,121
[45] Date of Patent: Aug. 5, 1997

[54] FOOD FREEZER

[75] Inventor: Yoshio Yamada, Kanagawa Pref., Japan

[73] Assignee: Technican Company Ltd., Tokyo, Japan

[21] Appl. No.: 518,510

[22] Filed: Aug. 23, 1995

[30] Foreign Application Priority Data

Aug. 24, 1994 [JP] Japan ................... 6-233959
Aug. 1, 1995 [JP] Japan ................... 7-225660

[51] Int. Cl.$^6$ ................................. F25D 17/02
[52] U.S. Cl. ........................... 62/374; 62/378
[58] Field of Search ................ 62/374, 375, 376, 62/378, 63, 64

[56] References Cited

U.S. PATENT DOCUMENTS

| | | | |
|---|---|---|---|
| 1,530,108 | 3/1925 | Collins | 62/375 X |
| 1,939,109 | 12/1933 | Davidson | 62/375 X |
| 2,324,517 | 7/1943 | King | 62/375 X |
| 3,228,206 | 1/1966 | Lockerby | 62/375 X |
| 3,486,345 | 12/1969 | Waldin | 62/375 X |
| 3,605,428 | 9/1971 | Smith et al. | 62/375 X |
| 4,030,898 | 6/1977 | Morita | 62/375 X |
| 5,165,256 | 11/1992 | Yamada | 62/373 |

*Primary Examiner*—William E. Tapolcai
*Attorney, Agent, or Firm*—Jacobson, Price, Holman & Stern, PLLC

[57] ABSTRACT

The food freezer of the present invention comprises a freezing chamber 1 of a closed structure housing an anti-freeze liquid 3 within the inside thereof and providing a refrigerant flowing means 2a~2z, an anti-freeze stirring means 4 and a temperature sensor 5 in the anti-freeze liquid; a food delivery-in chamber 6 connectingly provided at an inlet of the freezing chamber 1; a frozen food delivery-out chamber 7 connectingly provided at an outlet of the freezing chamber 1; a rail 8 circulating between the delivery-in chamber 6 and the delivery-out chamber 7 and running the proximity of a liquid level of the anti-freeze liquid 3, when running within the freezing chamber 1 on the way; and food conveyor means 9 suspended from the line 8.

7 Claims, 2 Drawing Sheets

FOOD FREEZER

BACKGROUND OF THE INVENTION

1. Field of Invention

The present invention relates to a food freezer, more particularly, relates to a food freezer for continuously liquid freezing large edible meat blocks.

2. Related Art Statement

Methods for freezing and preserving food such as edible meat are roughly classified into a freezing method by blasting cold air to these foodstuffs and a freezing method by immersing foodstuffs into an anti-freeze liquid refrigerated by a refrigerant.

However, the former method tends to cause freezing unevenness, and a freezing rate is slow. Therefore, in case of freezing food of large shape, a very long period of time is required, and as a result, productivity becomes low, the time for passing through a maximum freezing forming temperature zone (i.e $-1°$ C. to $-10°$ C.) is long and a drip phenomenon is liable to occur at the time of defrosting.

On the other hand, the liquid freezing does not cause freezing unevenness and has a quick freezing rate so as to provide such advantages that productivity is high and no drip occurs at the time of defrosting.

Therefore, a liquid freezing system recently attracts attention, and such freezers have been developed.

However, many freezers for liquid freezing available on the market at present aim at relatively small-shaped food, and a batch type is often employed for freezing food as shown in U.S. Pat. No. 5,165,256.

However, with the recent increase of a demand of frozen food, there is a strong request for a device which can freeze large-shaped food under continuously high productivity.

The present invention relates to a device developed according to the demand, and aims to provide a food freezer which can continuously liquid freeze, for example, even a large meat block of about 1 ton by weight and remarkably improve productivity at the time of freezing.

SUMMARY OF THE INVENTION

The present invention is invented for obviating the above short-coming, and the present invention relates to a food freezer comprising a freezing chamber of a closed structure housing an anti-freeze liquid within the inside thereof and providing a refrigerant flowing means connected to a refrigerant compressor, an anti-freeze stirring means and a temperature sensor in the anti-freeze; a food delivery-in chamber connectingly provided at an inlet of the freezing chamber; a frozen food delivery-out chamber connectingly provided at an outlet of the freezing chamber; a circulating rail provided between the delivery-in chamber and the delivery-out chamber and running in proximity to a liquid level of the anti-freeze liquid when running within the freezing chamber on the way; and food conveyor means suspended from the circulating rail.

Another object of the food freezer of the present invention is to provide a food delivery-in chamber connected to an inlet of a freezing chamber of a closed structure, further provided with a frozen food delivery-out chamber at an outlet of the freezing chamber, and provided with a rail circulating and running through the delivery-in chamber, the freezing chamber and the delivery-out chamber provided at the upper portion within the device, wherein food conveyor means is suspended from the rail.

When this rail is circulating and running, the food conveyor means circulates and moves three chambers of the delivery-in chamber, the freezing chamber and the delivery-out chamber under the condition of delivery-in chamber→freezing chamber→delivery-out chamber→delivery-in chamber→freezing chamber→delivery-out chamber . . . . Therefore, the food loaded on the food conveyor means moves through delivery in chamber→freezing chamber→delivery-out chamber, and in this course, the food is immersed in an anti-freeze liquid in the freezing chamber, and moved within the anti-freeze liquid as it is to proceed freezing. The food is then conveyed to the delivery-out chamber and unloaded from the food conveyor means. Food of another lot is loaded on the emptied food conveyor means and the food conveyor means again runs the course of delivery-in chamber→freezing chamber→delivery-out chamber to proceed freezing of food of another lot.

Thus, according to the device of the present invention, freezing of food can be continued by circulating and running a rail. Therefore, productivity at the time of freezing becomes very high.

1 is freezing chamber, 1a is ceiling of freezing chamber 1, 1b is sidewall of freezing chamber 1, 1c is base portion of freezing chamber 1, 2a~2z are refrigerant flowing means, 3, 3a are anti-freeze liquids, 4 is stirring means, 5 is temperature sensor, 6 is food delivery-in chamber, 6a, 6b are door of delivery-in chamber 6, 7 is frozen food delivery-out chamber, 7a, 7b are doors of delivery-out chamber 7, 8 is rail, 9 is food conveyor means, 10 is food, 11 is blower means, 12a~12g are refrigerant compressors, 13 is filter means.

DESCRIPTION OF THE PREFERRED EMBODIMENTS

The device of the present invention is explained by referring to the accompanying drawings as follows.

Figure 1:
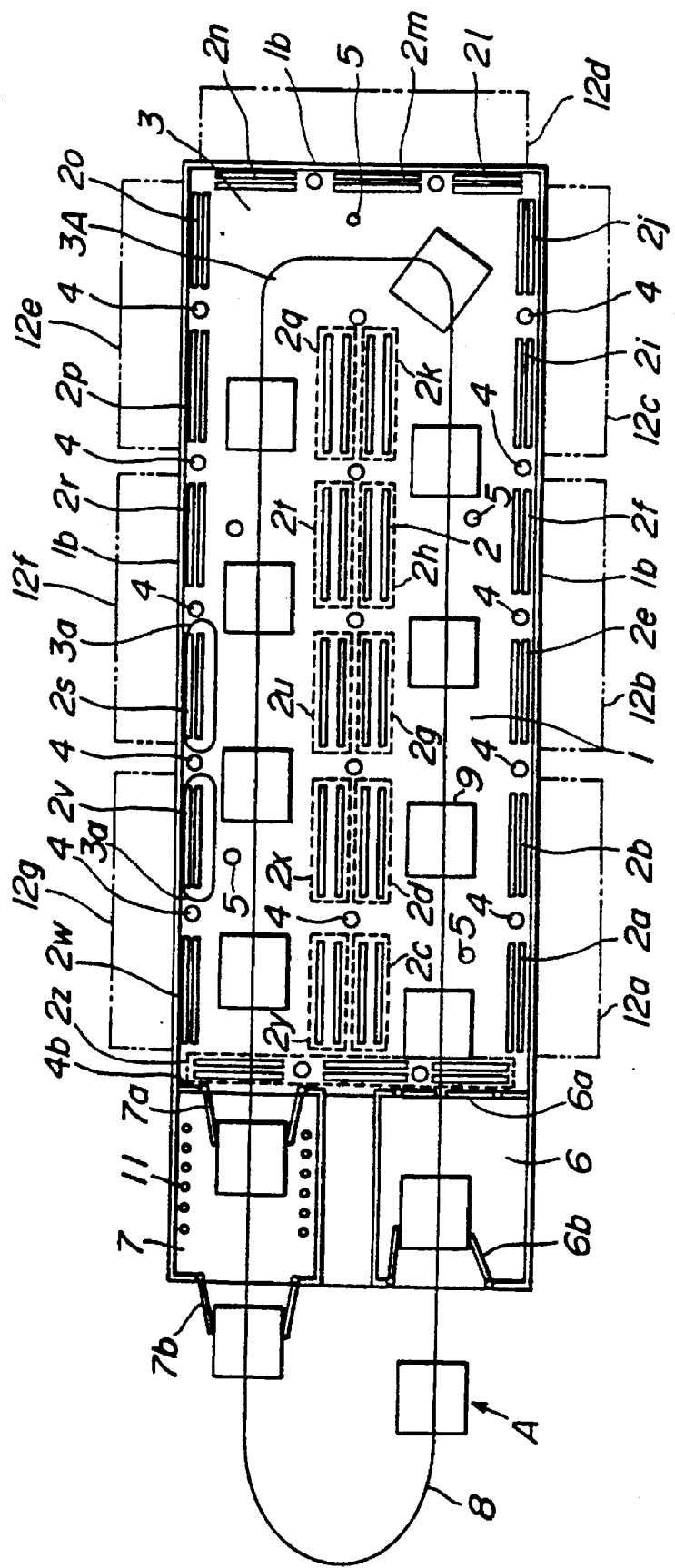
FIG. 1 is a rough plan view showing a fundamental construction of the device according to the present invention.
Figure 2:
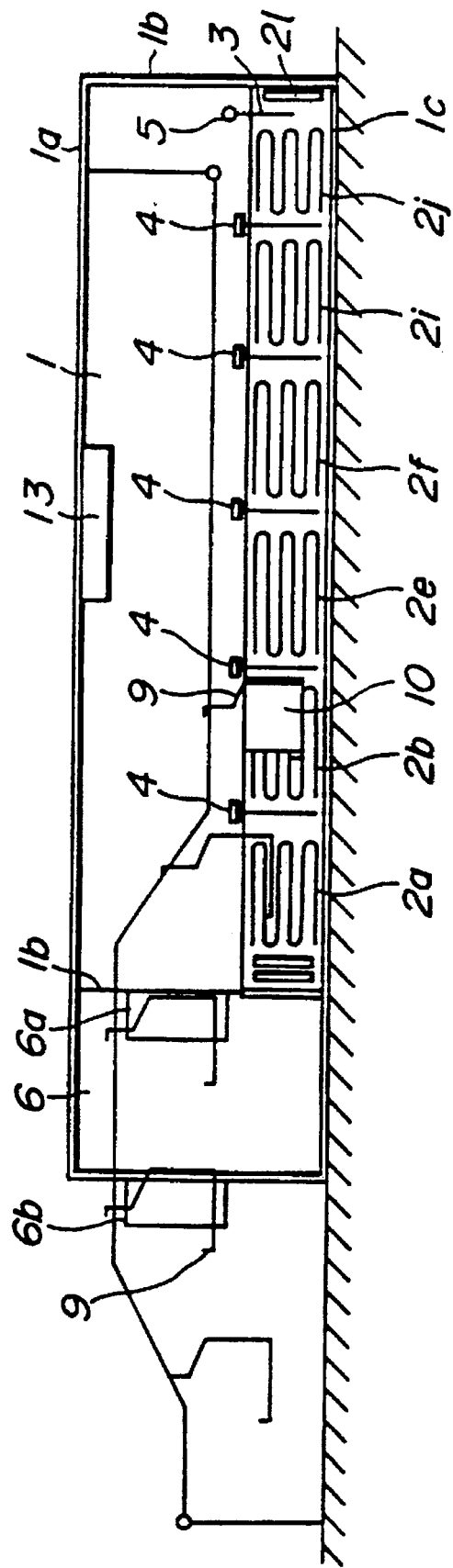
FIG. 2 is a rough side view showing a fundamental construction of the device according to the present invention.

FIGS. 1 and 2 are a plan view and a side view, respectively, showing one embodiment of the present invention.

First, a freezing chamber 1 is of a box shape of a closed structure as a whole, and a ceiling 1a, a sidewall 1b and a base portion 1c are of an insulating structure with the use of insulating material consisting of combination of, for example, stainless steel sheet and expanded urethane, respectively.

At portion close to the sidewall 1b of the freezing chamber 1 are disposed a plurality of mutually connected refrigerant flowing means 2a, 2b, 2e, 2f, 2i, 2j, 2l, 2m, 2n, 2o, 2p, 2r, 2s, 2v, 2w, 2z, respectively, at predetermined spaces, and these refrigerant flowing means are all immersed in an anti-freeze liquid 3. The refrigerant flowing means is made by bending, for example, a stainless steel pipe in zigzag within the same plane, and formed into a flat shape as a whole, and in the interior thereof is flowed a refrigerant such as freon compressed by a separately provided refrigerant compressed (not shown) and kept at a predetermined temperature, and an anti-freeze liquid 3a positioned at a peripheral zone is refrigerated to a predetermined temperature.

At the sidewall 1b of the freezing chamber 1 are disposed the flat-shaped refrigerant flowing means 2a, 2b, 2e, 2f, 2i, 2j, 2l, 2m, 2n, 2o, 2p, 2r, 2s, 2v, 2w, 2z along the inner wall of the freezing chamber 1 in a perpendicular direction. Moreover, at the center portion of the freezing chamber in a width direction are disposed the refrigerant flowing means 2c, 2y, 2d, 2x, 2g, 2u, 2h, 2t, 2k, 2q, thereby forming a row of the refrigerant flowing means in a longitudinal direction of the freezing chamber. Between terminals (end portions of the refrigerant flowing means 2k, 2q) of this row and the side surface 1b (sidewall on the right side of the drawings) of the freezing chamber 1 is secured a space for passing food conveyor means which is explained later on. Thus, at the base portion of the freezing chamber 1 is formed an anti-freeze liquid zone 3A of a U-shaped plane in a longitudinal direction as a whole.

Between these refrigerant flowing means 2a~2z are disposed stirring means 4 such as screw stirrers and jet stirrers which stir an anti-freeze liquid 3 and maintain a temperature of the anti-freeze liquid uniformly. Moreover, at suitable positions of the anti-freeze 3 are immersed suitable numbers of temperature sensors 5 in the anti-freeze liquid 3 for measuring a temperature of the anti-freeze liquid 3, controlling the operating condition of the above-described refrigerant compressor by the temperature signal, regulating the temperature of the refrigerant flowed into the refrigerant flowing means 2 and the working condition of the stirring means 4 and controlling the temperature of the anti-freeze liquid 3 to a predetermined temperature.

Moreover, as to temperature control of the anti-freeze liquid 3, it is possible to employ a system of connecting the whole of the refrigerant flowing means 2 shown in FIG. 1 to the same refrigerant compressor (not shown) and supplying a refrigerant from the same refrigerant compressor to all refrigerant flowing means 2, that is, a system of supplying a refrigerant compressed by the same refrigerant compressor to a plurality of refrigerant flowing means under the equally divided condition.

Furthermore, the following system can be employed. That is, as shown by imaginary lines in FIG. 1, in the freezing chamber 1, for example, are disposed a plurality (seven in FIG. 1) of independent refrigerant compressors 12a, 12b, 12c, 12d, 12e, 12f, 12g, respectively.

Then, refrigerant flowing means 2a, 2b, 2c, 2d are connected to the refrigerant compressor 12a, refrigerant flowing means 2e, 2f, 2g, 2h to the refrigerant compressor 12b, refrigerant flowing means 2i, 2j, 2k to the refrigerant compressor 12c, refrigerant flowing means 2l, 2m, 2n to the refrigerant compressor 12d, refrigerant flowing mean 2o, 2p, 2q to the refrigerant compressor 12e, refrigerant flowing means 2r, 2s, 2t, 2u to the refrigerant compressor 12f, and refrigerant flowing means 2v, 2w, 2x, 2y, 2z to the refrigerant compressor 12g, respectively, and to each of the refrigerant flowing means 2a~2z is supplied a refrigerant from the refrigerant compressors 12a~12g connected thereto, respectively, thereby refrigerating anti-freeze liquids of the peripheral zones of each refrigerant flowing means to a predetermined temperature.

One sidewall (i.e. wall on the left side in FIG. 1) of the freezing chamber in a longitudinal direction is provided with doors 6a, 7a designed to automatically open together on hinges, for example, and each of these doors 6a, 7a is connectingly provided with a delivery-in chamber 6 and a delivery-out chamber 7 having predetermined interior spaces respectively. Moreover, the other surfaces of the delivery-in chamber 6 and the delivery-out chamber 7 are provided with doors 6b, 7b which automatically open together on hinges. Furthermore, these doors 6a, 6b; 7a, 7b are of insulating structure.

On the route from the delivery-in chamber 6 to the freezing chamber 1 and the delivery-out chamber 7, a circulating and running rail 8 is disposed. The rail 8 consists of a chain trolley, for example, suspended from the ceiling 1a of the device, and as shown in FIG. 1, said chain trolley runs by looping delivery-in chamber 6—U-shaped zone 3A of refrigerant chamber 1—delivery-out chamber 7, and as shown in FIG. 2, said chain trolley runs at a height in the delivery-in chamber 6, and runs the vicinity of the liquid level by gradually lowering to a running position when entering from the door 6a to the freezing chamber 1, so as to run the U-shaped zone 3A at a position for immersing food conveyor means, which is explained later on, in the anti-freeze liquid 3, then runs by successively lifting to a running position from the front of the delivery-out chamber 7, and passes through the door 7a and runs the height of the delivery-out chamber 7.

The rail 8 suspends a plurality of food conveyor means 9 such as gondolas, in which is loaded food 10 to be frozen.

In case of operating this device, first, food 10 to be frozen is loaded and fixed on food conveyor means 9 at an exterior position A of the delivery-in chamber 1. In this case, it is preferable to vacuum-pack the food 10 with the use of a plastic film, so as not to directly bring into contact with an anti-freeze liquid which will be described later on.

The rail 8 is circulated and run at a predetermined rate.

The food conveyor means 9 and the food 10 approach the delivery-in chamber 6 at a predetermined rate. The approach is sensed by a measuring sensor, for example, the door 6b automatically opens, the food conveyor means 9 and the food 10 are delivered in the delivery-in chamber 6, and when delivery into the delivery-in chamber 6 is completed, the door 6b automatically shuts and the door 6a on the side of the freezing chamber automatically opens.

The food conveyor means 9 and the food 10 are delivered into the freezing chamber 1 from the door 6a. Then, when delivery is completed, the door 6a automatically shuts, the food conveyor means 9 and the food 10 are conveyed into the freezing chamber 1, successively lowered in height to be immersed in an anti-freeze liquid 3, and moved in the anti-freeze liquid 3 at a predetermined rate. Then, since the food 10 is completely immersed in anti-freeze liquid 3, liquid freezing of the food 10 proceeds in this course.

In this case, the freezing condition of the food can optionally be regulated by appropriately setting running rate of the rail 8, temperature of the anti-freeze liquid and length of the U-shaped anti-freeze zone 3 in FIG. 1.

The completely frozen food 10 and the food conveyor means 9 are gradually lifted from the anti-freeze liquid 3 in front of the delivery-out chamber 7, and successively lifted high to approach the delivery out chamber 7. The approach of conveyer means 9 is sensed by a measuring sensor, for example, the door 7a on the side of the freezing chamber of the delivery-out chamber 7 opens, and the frozen food 10 and the food conveyor means 9 enter into the delivery-out chamber 7. At the same time, the door 7a shuts, the door 7b on the opposite side opens, and the frozen food and the food conveyor means 9 come out of the delivery-out chamber 7. And, the frozen food is unloaded from the food conveyor means 9, transferred to a shipping system, and the circulating and running food conveyor means 9 is again forwarded to the side of the delivery-in chamber.

In this case, if blower means 11 is disposed on the inner wall of the delivery-out chamber 7, cold air is blasted to the frozen food entered in the delivery-out chamber 7 from the blower means, so that it is preferable to remove the anti-freeze liquid adhered to the frozen food.

The above-described freezing treatment continuously proceeds by circulating and running the rail 8. Therefore, the frozen food is continuously produced by continuing operation of successively loading the food 10 on the food conveyor means 9 sent back under the empty condition, so that its productivity is remarkably improved.

Moreover, when operation is continued, dust and dirt are sometimes mixed into the anti-freeze liquid 3, so that if filter means 13 is disposed on the ceiling 1a of the freezing chamber 1, the anti-freeze liquid 3 is sent to the filter means 13, dust and dirt are removed therein, then the anti-freeze liquid is flowed back to the freezing chamber 1 for use, so that use life of the anti-freeze liquid 3 can preferably be prolonged.

The embodiment explains the case of connectingly providing the delivery-in chamber and the delivery-out chamber in one sidewall (i.e. left side of FIGS. 1 and 2) of the freezing chamber, but the device of the present invention is not limited thereto, and may preferably be formed into such structure, for example, that the delivery-in chamber, the freezing chamber and the delivery-out chamber are connected in series in this order, and the rail is circulated and run between each chamber.

Furthermore, in case of the device shown in FIG. 1, only one U-shaped anti-freeze zone 3A is existent within the freezing chamber 1, but the device of the present invention is not limited to such embodiment.

For example, if a plural row of refrigerant flowing means made by extending refrigerant flowing means in a longitudinal direction of the freezing chamber are formed in a width direction of the freezing chamber, and there is disposed a rail continued from the delivery-in chamber to the delivery-out chamber along each of the above rows, a plurality of U-shaped anti-freeze zones are formed from the delivery-in chamber to the delivery-out chamber in the freezing chamber, and it is possible to form the freezing route of zigzagged anti-freeze zones as a whole.

As apparent from the above explanation, the food freezer of the present invention 1 circulates and runs a rail through delivery-in chamber—freezing chamber—delivery-out chamber, so that food loaded on food conveyor means suspended from the rail is conveyed under the condition of immersing into an anti-freeze liquid in the freezing chamber, and continuously liquid-frozen in this process. Therefore, frozen food can continuously be manufactured under high productivity without causing any drip phenomenon at the time of defrosting.

Particularly, in the structure of the present invention 2, the inside of one freezing chamber is divided into a plurality of U-shaped anti-freeze zones, and it is preferable to effectively use the inside of the freezing chamber for liquid freezing.

Moreover, in case of the food freezer of the present invention 3, refrigerant flowing means is flat-shaped, so that the inside of the freezing chamber can effectively be utilized.

According to the food freezer of the present invention, an anti-freeze to be used can be cleanly maintained by filter means. Moreover, the food freezer of the present invention 5 is provided with blower means in the delivery-out chamber, so that the anti-freeze liquid adhered to the frozen food can be removed, and the following shipping operation becomes easy.

The food freezer of the present invention uses a gondola as food conveyor means, so that even if food to be frozen is large, the food can positively be loaded and conveyed, so as to greatly improve freezing treatment capacity.

What is claimed is:

1. A food freezer comprising a freezing chamber of a closed structure filled with an anti-freeze liquid within the inside thereof and providing a plurality of refrigerant flowing means connected to a refrigerant compressor, an anti-freeze stirring means and a temperature sensor for sensing when said anti-freeze liquid is at a freezing temperature; a food delivery-in chamber connectingly provided at an inlet of the freezing chamber; a frozen food delivery-out chamber connectingly provided at an outlet of the freezing chamber; a circulating rail provided between the delivery-in chamber and the delivery-out chamber and running in the proximity of a liquid level of the anti-freeze liquid so as to dip a food into the anti-freeze liquid when running within the freezing chamber on the way; and food conveyor means suspended from the circulating rail, said plurality of refrigerant flowing means being suspended on an inner wall peripheral surface of the freezing chamber, and a row of refrigerant flowing means extended in a longitudinal direction of said freezing chamber, by forming at least one row, forms an anti-freeze liquid zone which is U-shaped when viewed from a plane in said freezing chamber, said food conveyor means being of a gondola form which is suspended from said circulating rail.

2. A food freezer as claimed in claim 1, wherein the refrigerant flowing means is flat-shaped by bending a stainless steel tube into zigzag shape.

3. A food freezer as claimed in claim 1, wherein a ceiling in the inside of said freezing chamber is provided with anti-freeze liquid filter means.

4. A food freezer as claimed in claim 1, wherein the delivery-out chamber is provided with blower means for removing the anti-freeze liquid adhered to the frozen food.

5. A food freezer as defined in claim 4 wherein each of said delivery-in chamber and delivery-out chamber includes spaced openable doors to isolate said freezing chamber from the delivery-in chamber and the delivery-out chamber, said blower means being disposed along opposite sides of said delivery-out chamber for discharging air toward opposite surfaces of frozen food positioned in said delivery-out chamber.

6. A food freezer as defined in claim 1 wherein said circulating rail includes a U-shaped portion between the delivery-out chamber and the delivery-in chamber externally of the freezing chamber to enable continuous suspension of the food conveyor means when moving from the delivery-out chamber to the delivery-in chamber to enable frozen food to be removed from the food conveyor means and placement of food to be frozen thereon as the food conveyor means moves from the delivery-out chamber along the U-shaped portion to the delivery-in chamber to enable continuous movement of food through the freezing chamber.

7. A food freezer comprising a closed freezer chamber having an openable closure at an entrance and exit, liquid refrigerant in said freezing chamber, a continuous supporting rail in said freezing chamber in generally parallel relation to an upper surface of the liquid refrigerant, food conveyor means movably supported on said rail, a delivery-in chamber at the entrance of the freezer chamber, said delivery-in chamber being isolated from the freezing chamber by said openable closure at the entrance to the freezing chamber, a delivery-out chamber at the exit of the freezer chamber and isolated therefrom by said openable closure at the exit to the freezer chamber, said rail extending into said delivery-in chamber and into said delivery-out chamber, said delivery-out chamber including means discharging air toward frozen food on the food conveyor means when oriented in said delivery-out chamber.

* * * * *